(12) United States Patent
Iwashita et al.

(10) Patent No.: US 9,288,409 B2
(45) Date of Patent: Mar. 15, 2016

(54) IMAGE PICKUP APPARATUS, IMAGE PICKUP SYSTEM, AND METHOD FOR CONTROLLING IMAGE PICKUP APPARATUS

(71) Applicant: CANON KABUSHIKI KAISHA, Tokyo (JP)

(72) Inventors: Atsushi Iwashita, Honjo (JP); Toshio Kameshima, Kumagaya (JP); Tomoyuki Yagi, Honjo (JP); Katsuro Takenaka, Honjo (JP); Hideyuki Okada, Honjo (JP); Sho Sato, Kumagaya (JP); Eriko Sugawara, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 13/721,475

(22) Filed: Dec. 20, 2012

(65) Prior Publication Data
US 2013/0169784 A1    Jul. 4, 2013

(30) Foreign Application Priority Data

Dec. 28, 2011    (WO) .................. PCT/JP2011/080371

(51) Int. Cl.
*H04N 5/359*    (2011.01)
*G01T 1/24*    (2006.01)
*H04N 5/361*    (2011.01)
*H04N 5/32*    (2006.01)

(52) U.S. Cl.
CPC .............. *H04N 5/3597* (2013.01); *G01T 1/247* (2013.01); *H04N 5/32* (2013.01); *H04N 5/361* (2013.01)

(58) Field of Classification Search
CPC ....... H04N 7/18; H04N 5/361; H04N 5/3597; H04N 5/32; H04N 5/3675; H04N 5/2176; G01T 1/247
USPC ..................... 348/241, 243, 615, 222.1, 607
See application file for complete search history.

(56) References Cited

U.S. PATENT DOCUMENTS

2004/0119855 A1*    6/2004    Partain et al. .................. 348/243
2007/0040099 A1*    2/2007    Yokoyama et al. ......... 250/208.1
(Continued)

FOREIGN PATENT DOCUMENTS

JP    60112180 A    6/1985
JP    10253761 A    9/1998
(Continued)

*Primary Examiner* — Nelson D. Hernández Hernández
(74) *Attorney, Agent, or Firm* — Canon USA Inc. IP Division

(57) ABSTRACT

An image pickup apparatus includes a detector and an image processing unit. The detector executes image pickup operations in which electrical signals based on radiation are output and executes, in a period between a first image pickup operation and a second image pickup operation, a first inter-image pickup operation for suppressing a lag generated by the first image pickup operation and a second inter-image pickup operation for obtaining dark signals from the detector after the first inter-image pickup operation. The signal processing unit calculates a correction coefficient using a first time ts, a second time te, and the dark signals, predicts an amount of offset to be included in electrical signals of the second image pickup operation using a third time ts', a fourth time te', and the correction coefficient, and executes calculation using the electrical signals and the amount of offset output from the detector in the second image pickup operation.

20 Claims, 8 Drawing Sheets

(56) References Cited

U.S. PATENT DOCUMENTS

| | | | |
|---|---|---|---|
| 2008/0246065 A1* | 10/2008 | Takenaka et al. | 257/292 |
| 2009/0001276 A1* | 1/2009 | Yagi et al. | 250/370.09 |
| 2010/0020933 A1* | 1/2010 | Topfer et al. | 378/98.11 |
| 2013/0136234 A1* | 5/2013 | Noma et al. | 378/91 |
| 2013/0182934 A1* | 7/2013 | Topfer et al. | 382/132 |
| 2015/0078528 A1* | 3/2015 | Okada | 378/97 |

FOREIGN PATENT DOCUMENTS

| | | |
|---|---|---|
| JP | 2002199278 A | 7/2002 |
| JP | 2006075359 A | 3/2006 |
| JP | 2006305228 A | 11/2006 |
| JP | 2008259045 A | 10/2008 |
| JP | 201172358 A | 4/2011 |
| JP | 2011183006 A | 9/2011 |
| JP | 2011194005 A | 10/2011 |

\* cited by examiner

IMAGE PICKUP APPARATUS, IMAGE PICKUP SYSTEM, AND METHOD FOR CONTROLLING IMAGE PICKUP APPARATUS

TECHNICAL FIELD

The present invention relates to an image pickup apparatus, an image pickup system, and methods for controlling those. More specifically, the present invention relates to a radiation image pickup apparatus and a radiation image pickup system which may find applicable use in general still image capture such as radiography and moving image capture such as fluoroscopy in medical diagnosis or in non-destructive testing. Methods for controlling the foregoing are also disclosed.

BACKGROUND ART

Radiation image pickup apparatuses adopting digital flat panel detectors (hereinafter referred to as FPD detectors or simply detectors) formed by a semiconductor material are being put to practical use as image pickup apparatuses used for medical image diagnosis and non-destructive testing using X-rays. Such radiation imaging apparatuses are used, for example, as digital image pickup apparatuses for general still image capture such as radiography and moving image capture such as fluoroscopy in medical image diagnosis. Flat panel detectors can be classified into "indirect conversion" and "direct conversion" detectors differentiated by the radiation detection principle. A detector of indirect conversion type is known in which a conversion element obtained by combining a photoelectric conversion element using amorphous silicon and a wavelength conversion member that converts radiation into light in a wavelength band that can be detected by the photoelectric conversion element with each other is used. A detector of direct conversion type is also known in which a conversion element that directly converts radiation into charge using a material such as amorphous selenium is used.

In an image pickup apparatus, dangling bonds and defects in a semiconductor layer of each conversion element including the semiconductor layer composed of an amorphous semiconductor can function as trap centers for charge carriers. When an image is captured a plurality of times, charge generated by radiation or light radiated in a previous image pickup operation might be trapped by trap levels. In such a case, it is possible that a so-called lag, in which the charge trapped in the previous image pickup operation affects an image obtained in a subsequent image pickup operation, can be generated in the image obtained in the subsequent image pickup operation. Although the lag can be suppressed by increasing a time (hereinafter referred to as image pickup operation intervals) between the previous image pickup operation and the subsequent image pickup operation, usefulness of the imaging apparatus decreases when the image pickup operation intervals are increased. Therefore, the image pickup apparatus is required to decrease the image pickup operation intervals while suppressing a lag that can be generated in a subsequent image pickup operation.

In order to suppress the lag, reset operations have been disclosed, for example in patent literature (PTL) documents (PTL 1 and PTL 2) discussed below. Specifically, in order to suppress lag between subsequent imaging operations, a voltage different from a voltage during an image pickup operation is applied to each conversion element such as a photodiode or an MIS photoelectric conversion element between a plurality of image pickup operations. More specifically, in PTL 1, a reverse voltage larger than or a reverse voltage smaller than a reverse voltage of the photodiode during the image pickup operation or a forward voltage is applied to the photodiode during the reset operation. In PTL 2, a voltage different from the voltage during the image pickup operation is applied to each MIS photoelectric conversion element such that electrodes of the MIS photoelectric conversion element become ground during a sleep (reset) operation. In PTL 1 and PTL 2, it is disclosed that charge that can be a lag is removed from each conversion element by such reset operations.

CITATION LIST

Patent Literature

PTL 1 Japanese Patent Laid-Open No. 10-253761
PTL 2 Japanese Patent Laid-Open No. 2002-199278

In the above-described known reset operation techniques, although the lag can be suppressed, noise can increase because current flows into each conversion element as a result of the reset operations. Accordingly, the signal-to-noise (S/N) ratio decreases, and this is detrimental to image quality. In PTL 2, it is suggested that the period of the reset operation and voltage during the reset operation are set to optimized values, in order to achieve an effect of suppressing the lag and suppress the current flowing into each conversion element as a result of the reset operation. However, it has been difficult to suppress the lag while securing a sufficient S/N ratio only by optimizing the period of the reset operation and the voltage during the reset operation.

Some aspects of the present invention aim to solve the above-discussed issues of image-quality deficiency in the existing configurations and to provide an image pickup apparatus that can suppress a lag with short image pickup operation intervals and that can obtain an image of a desirable S/N ratio.

SUMMARY OF INVENTION

According to one aspect of the present invention, an image pickup apparatus includes a detector that includes a plurality of conversion elements which convert radiation into charge and that executes image pickup operations in which electrical signals based on the charge are output, a control unit that controls the detector such that the detector executes, in a period between a first image pickup operation and a second image pickup operation, which is executed after the first image pickup operation, among the image pickup operations that are performed a plurality of times, inter-image pickup operations including a first inter-image pickup operation for suppressing a lag generated by the first image pickup operation and a second inter-image pickup operation for obtaining, from the detector, dark signals based on charges included in the conversion elements that are in a state in which the radiation is not radiated after the first inter-image pickup operation, and a signal processing unit that executes arithmetic processing on the electrical signals output from the detector. The signal processing unit calculates a correction coefficient using a first time until the conversion elements begin to accumulate charges for the second inter-image pickup operation after the first inter-image pickup operation is completed, a second time until the second inter-image pickup operation begins after the first inter-image pickup operation is completed, and the dark signals, predicts an amount of offset to be included in electrical signals output from the detector in the second image pickup operation using a third time until the conversion elements begin to accumulate charges for the second image pickup operation after the first inter-image pickup operation is completed, a fourth time until an operation for outputting the electrical signals begins in the second image pickup operation after the first inter-image pickup operation is completed, and the correction coefficient, and executes calculation using the electrical signals and the amount of offset output from the detector in the second image pickup operation.

According to a further aspect of the present invention, a method for controlling an image pickup apparatus includes executing, using a detector that includes a plurality of conversion elements which convert radiation into charge and that executes an image pickup operation in which electrical signals based on the charge are output, in a period between a first image pickup operation and a second image pickup operation, which is executed after the first image pickup operation, among the image pickup operations that are performed a plurality of times, inter-image pickup operations including a first inter-image pickup operation for suppressing a lag generated by the first image pickup operation and a second inter-image pickup operation for obtaining, from the detector, dark signals based on charges included in the conversion elements that are in a state in which the radiation is not radiated after the first inter-image pickup operation, calculating, using a signal processing unit that executes arithmetic processing on the electrical signals output from the detector, a correction coefficient using a first time until the conversion elements begin to accumulate charges for the second inter-image pickup operation after the first inter-image pickup operation is completed, a second time until the second inter-image pickup operation begins after the first inter-image pickup operation is completed, and the dark signals, predicting, using the signal processing unit, an amount of offset to be included in electrical signals output from the detector in the second image pickup operation using a third time until the conversion elements begin to accumulate charges for the second image pickup operation after the first inter-image pickup operation is completed, a fourth time until an operation for outputting the electrical signals begins in the second image pickup operation after the first inter-image pickup operation is completed, and the correction coefficient, and executing, using the signal processing unit, calculation using the electrical signals and the amount of offset output from the detector in the second image pickup operation.

Further aspects and features of the present invention will become apparent from the following description of exemplary embodiments with reference to the attached drawings.

DESCRIPTION OF EMBODIMENTS

Embodiments of the present invention will be described in detail hereinafter with reference to the drawings. It is to be noted that radiations in the present invention include alpha rays, beta rays, and gamma rays, which are beams composed of particles (include photons) emitted as a result of radioactive decay, as well as beams having the same or higher energy, such as, for example, X-rays, particle beams, and cosmic rays.

First Embodiment

Figure 2A:
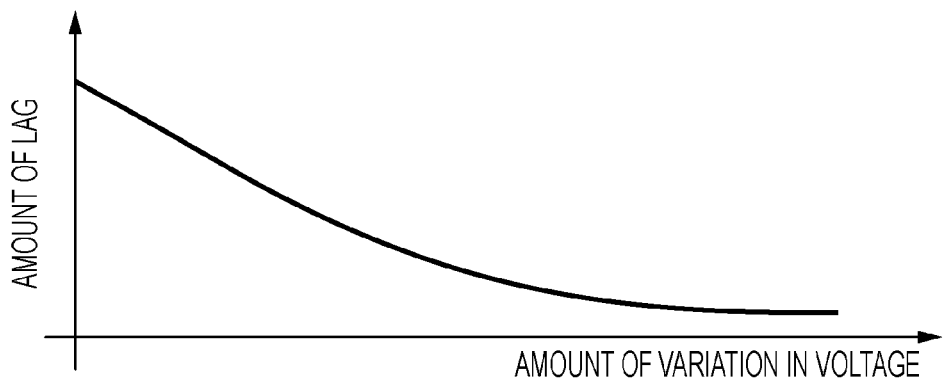
FIG. 2A is a characteristic diagram for illustrating the voltage variation dependence of the amount of lag of a conversion element according to the present invention.
Figure 2B:
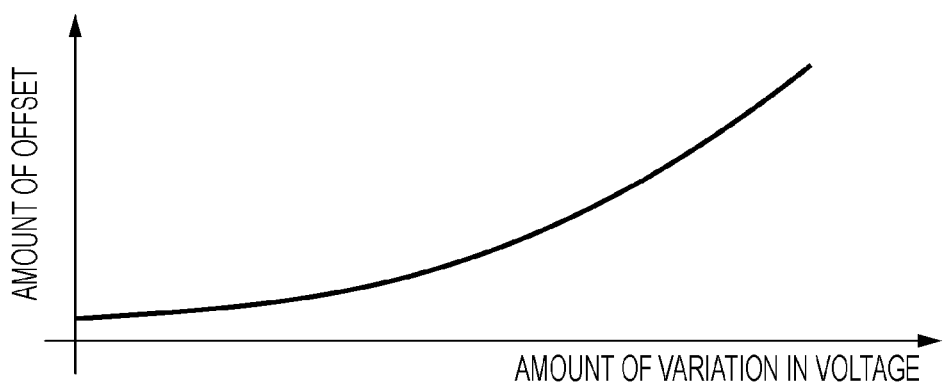
FIG. 2B is a characteristic diagram for illustrating the voltage variation dependence of the amount of offset of the conversion element according to the present invention.

First, in order to describe the concept of the present invention, the characteristics of the amount of lag of a conversion element according to an embodiment of the present invention will be described with reference to FIG. 2A, the characteristics of the amount of offset will be described with reference to FIG. 2B, and the time-varying characteristics of the amount of offset will be described with reference to FIG. 2C. It is to be noted that, in FIG. 2, characteristics in an operation (hereinafter referred to as a lag suppression operation) for suppressing a lag are illustrated while taking characteristics in an operation for applying a voltage (hereinafter referred to as a second voltage) different from a voltage (hereinafter referred to as a first voltage) for depleting a semiconductor layer to the conversion element between a plurality of image pickup operations as an example.

The conversion element includes the semiconductor layer between two electrodes that face each other and becomes able to convert radiation or light into charge when voltage has been applied between the two electrodes. Here, the voltage applied between the two electrodes of the conversion element is voltage applied to the conversion element. During an image pickup operation, which includes a period in which radiation or light is radiated, the first voltage is applied between the two electrodes as the voltage applied to the conversion element. In doing so, the conversion element can convert radiation or light into charge.

The amount of offset and the amount of lag are indicators that determine the quality of electrical signals output from a detection unit including a plurality of conversion elements. An offset is an image signal that includes noise in a conversion element and that can be obtained from a detector even when radiation or light is not radiated onto the conversion element. Here, the noise in the conversion element is a component mixed into a signal from the conversion element separately from a signal obtained by the conversion element by converting radiation or light, and the cause of the noise in the conversion element is mainly dark current. The cause of the dark current is that current flows into the conversion element when the voltage applied to the conversion element has changed, and movement of charge due to the current affects trap levels. In addition, a lag occurs when an electrical signal that has been converted by a conversion element on the basis of radiation of radiation or light performed in a previous one of the plurality of image pickup operations affects an electrical signal output in a subsequent image pickup operation. The cause of the lag is mainly charge captured by the trap levels and residual charge in a conversion element that has not been output from the conversion element.

As described in the related art, by applying the second voltage, which is different from the first voltage, to a conversion element between the plurality of image pickup operations, the lag can be suppressed. In addition, as illustrated in first FIG. 2A, by making a difference (hereinafter referred to as the amount of variation in voltage) between the second voltage and the first voltage larger, the amount of lag, which indicates how large the lag is, becomes smaller. Here, in FIG. 2A, the horizontal axis represents the absolute value of the amount of variation in voltage, and the vertical axis represents the amount of lag. On the other hand, as illustrated in FIG. 2B, by making the amount of variation in voltage larger, the amount of offset, which indicates how large the offset is, becomes larger. Here, in FIG. 2B, the horizontal axis represents the absolute value of the amount of variation in voltage, and the vertical axis represents the amount of offset.

Thus, when the amount of variation in voltage has been made larger in order to reduce the amount of lag, the amount of charge flowing into a conversion element increases, and accordingly the amount of offset undesirably increases and the S/N ratio of an image pickup apparatus undesirably increases. At this time, if a next image is captured after stabilization of noise is waited for in order to reduce the amount of offset, time until the next image is captured becomes long, thereby undesirably decreasing the usefulness of the image pickup apparatus. On the other hand, when the amount of variation in voltage has been made smaller, the amount of charge flowing into a conversion element decreases, and accordingly the amount of lag undesirably increases and the suppression of the lag undesirably becomes insufficient.

Figure 2C:
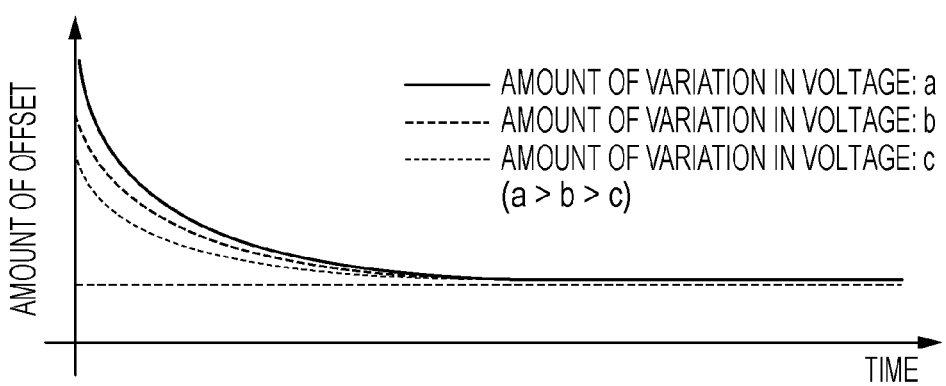
FIG. 2C is a characteristic diagram for illustrating the time variation dependence of the amount of offset of the conversion element according to the present invention.

Here, as illustrated in FIG. 2C, the present inventor has found that the amount of offset decreases and converges at a certain value when time has elapsed since the operation (the lag suppression operation) for varying the voltage applied to a conversion element in order to suppress a lag was completed. The certain value is a value included in each pixel, a read circuit, or the like, which will be described later, and unique to the apparatus. In addition, the present inventor has found that time response characteristics, in accordance with which the amount of offset decreases over time, depend on the amount of variation in voltage and are different every time the lag suppression operation is performed. This is probably because the amount of radiation or light radiated onto each pixel is different in every image pickup operation performed before the lag suppression operation. Therefore, even if the time response characteristics of the amount of offset are prepared in advance, it is difficult to properly calculate the amount of offset since the characteristics are different in every image pickup operation.

Figure 1:
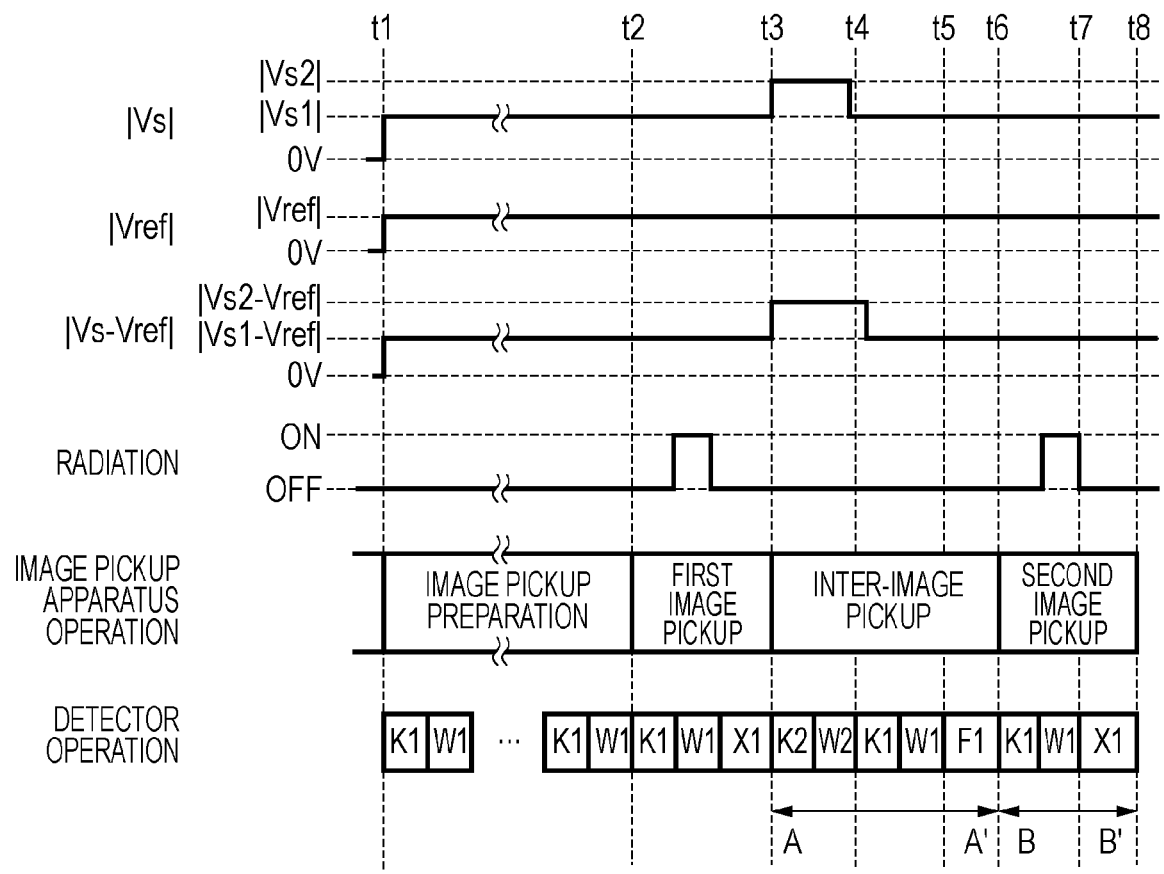
FIG. 1 is a timing chart of an image pickup apparatus according to the present invention.

Therefore, as a result of a sincere examination, the present inventor has found what will be described hereinafter. As illustrated in FIG. 1, in an image pickup apparatus that executes a plurality of image pickup operations in which image signals are obtained from a detector irradiated with radiation or light, a first image pickup operation and a second image pickup operation, which is performed after the first image pickup operation, are performed among the plurality of image pickup operations. In other words, in an image pickup apparatus that executes X image pickup operations, X being a natural number larger than 1, a first image pickup operation, which is an (X−1)th image pickup operation, and a second image pickup operation, which is an X-th image pickup operation, are performed among the X image pickup operations. Next, the detector is controlled such that the detector executes an inter-image pickup operation between the first image pickup operation and the second image pickup operation. In the inter-image pickup operation, first, the detector is controlled such that the detector executes the lag suppression operation (a first inter-image pickup operation) in a period between the first image pickup operation and the second image pickup operation. By such a lag suppression operation, a lag generated in the first image pickup operation can be properly suppressed. However, in the lag suppression operation, the offset undesirably increases. Next, the detector is controlled such that the detector executes at least one offset obtaining operation (a second inter-image pickup operation) in a period between the lag suppression operation and the second image pickup operation. In the offset obtaining operation, the detector is controlled such that a dark signal based on a charge included in a conversion element in a state in which the first voltage is applied but radiation or light is not radiated is obtained from the detector. A correction coefficient is calculated using the obtained dark signal, a first time (ts) until the conversion element begins to accumulate charges for the second inter-image pickup operation after the lag suppression operation is completed, and a second time (te) until the offset obtaining operation begins after the lag suppression operation is completed. Next, arithmetic processing is performed in order to predict the amount of offset that can be included in an electrical signal output from the detector in the second image pickup operation using the calculated correction coefficient, a third time (ts'), and a fourth time (te'). Here, the third time is a time until the conversion element begins to accumulate charges for an operation for outputting an image signal in the second image pickup operation after the lag suppression operation is completed. In addition, the fourth time is a time until the operation for outputting an image signal begins in the second image pickup operation after the lag suppression operation is completed. Next, arithmetic processing is performed using the obtained amount of offset and the electrical signal obtained by the second image pickup operation, such as by subtracting the amount of offset obtained by the arithmetic processing from the electrical signal obtained by the second image pickup operation. The present inventor has found that, in doing so, the lag generated in a previous image pickup operation can be suppressed while suppressing an increase in noise included in the offset. Each operation will be described in detail later.

Next, a radiation image pickup system according to the present embodiment will be described with reference to FIG. 3. It is to be noted that FIG. 3A is a diagram illustrating the configuration of the entirety of the system, and FIG. 3B is a diagram illustrating a detailed configuration around a signal processing unit 105, which will be described later.

Figure 3A:
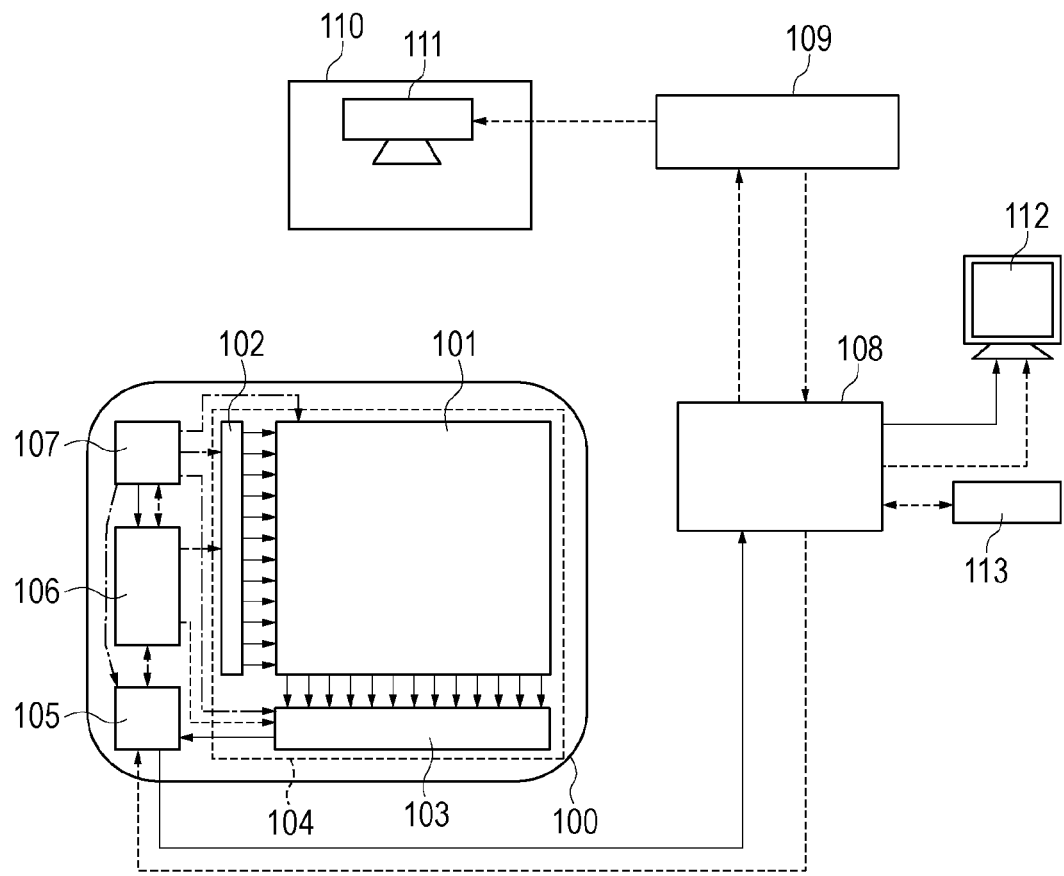
FIG. 3A is a schematic block diagram of an image pickup system according to the present invention.

The radiation image pickup system in the present invention illustrated in FIG. 3A includes an image pickup apparatus 100, a control computer 108, a radiation control apparatus 109, a radiation generation apparatus 110, a display apparatus 112, and a control desk 113. The image pickup apparatus 100 includes a flat panel detector 104 that includes a detection unit 101 including a plurality of pixels that convert radiation or light into electrical signals, a drive circuit 102 that drives the detection unit 101, and a read circuit 103 that outputs the electrical signals from the driven detection unit 101 as image data. The image pickup apparatus 100 further includes the signal processing unit 105 that processes and outputs the image data from the flat panel detector (the detector) 104, a control unit 106 that controls the operation of the detector 104, and a power supply unit 107. The signal processing unit 105 receives a control signal from a control computer 108, which will be described later, and provides the control signal for the control unit 106, as well as receiving the signals from the flat panel detector 104 and a control signal from the control unit 106 and executing arithmetic processing and the like, which will be described later. The configuration of the signal processing unit 105, the arithmetic processing, and the like will be described later. The control unit 106 receives the control signal from the control computer 108 and controls the drive circuit 102, the read circuit 103, the signal processing unit 105, and the power supply unit 107. The power supply unit 107 includes a power supply circuit such as a regulator that supplies voltage necessary for the detection unit 101, the drive circuit 102, and the read circuit 103. The power supply unit 107 according to the present embodiment is a variable power supply that can switch at least between the first voltage and the second voltage and supply the first voltage or the second voltage to conversion elements in the detection unit 101. The control computer 108 synchronizes the radiation generation apparatus 110 and the image pickup apparatus 100 with each other, transmits a control signal for determining the state of the image pickup apparatus 100, and executes image processing for correcting, saving, and displaying the image data from the image pickup apparatus 100. In addition, the control computer 108 transmits a control signal for determining radiation conditions of radiation to the radiation control apparatus 109 on the basis of information from the control desk 113. The radiation control apparatus 109 receives the control signal from the control computer 108 and controls an operation for radiating radiation from a radiation source 111 included in the radiation generation apparatus 110 and the like. The control desk 113 receives information regarding a subject and image pickup conditions as parameters for various types of control of the control computer 108 and transmits the parameters to the control computer 108. The display apparatus 112 displays the image data subjected to the image processing in the control computer 108.

Figure 3B:
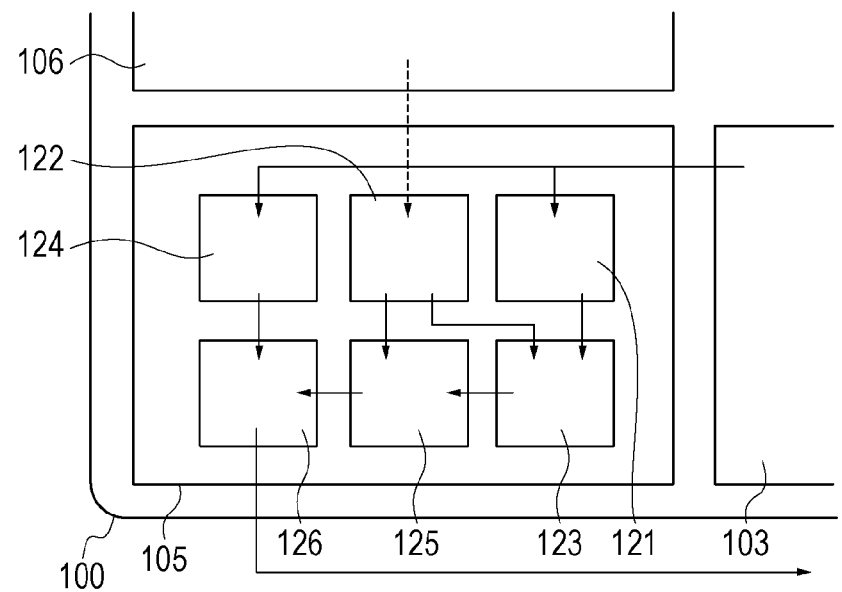
FIG. 3B is a schematic block diagram of a signal processing unit according to the present invention.

As illustrated in FIG. 3B, the signal processing unit 105 includes a first storage unit 121, a period calculation unit 122, a correction coefficient calculation unit 123, a second storage unit 124, an offset amount prediction unit 125, and an arithmetic unit 126. The first storage unit 121 stores an offset output obtained from the detector 104 in a state in which radiation or light is not radiated onto the conversion elements to which the first voltage is applied. Here, as the offset output, offset signals, which are a set of analog signals of the pixels, offset data, which is digital data regarding the offset signals, or an average value of the offset signals or the data may be used. The period calculation unit 122 calculates a time from the completion of the lag suppression operation to the beginning of the offset obtaining operation on the basis of at least one of various control signals output from the control unit 106 to the drive circuit 102 and the read circuit 103. A specific example will be described later. In addition, the period calculation unit 122 calculates a period from the completion of the inter-image pickup operation to the beginning of the operation for outputting an image signal in the second image pickup operation on the basis of one of the various control signals output from the control unit 106 to the drive circuit 102 and the read circuit 103. A specific example will be described later. The correction coefficient calculation unit 123 calculates a correction coefficient on the basis of the time from the completion of the lag suppression operation to the beginning of the offset obtaining operation and the offset output. A specific example will be described later. The second storage unit 124 stores the image signal obtained from the detector 104 in the second image pickup operation. The offset amount prediction unit 125 calculates a predictive value of the amount of offset that can be included in the image signal obtained in the second image pickup operation on the basis of the time from the completion of the inter-image pickup operation to the beginning of the operation for outputting an image signal in the second image pickup operation and the correction coefficient. A specific example will be described later. The arithmetic unit 126 executes arithmetic processing in which the calculated predictive value of the amount of offset is subtracted from the image signal obtained in the second image pickup operation.

Figure 4:
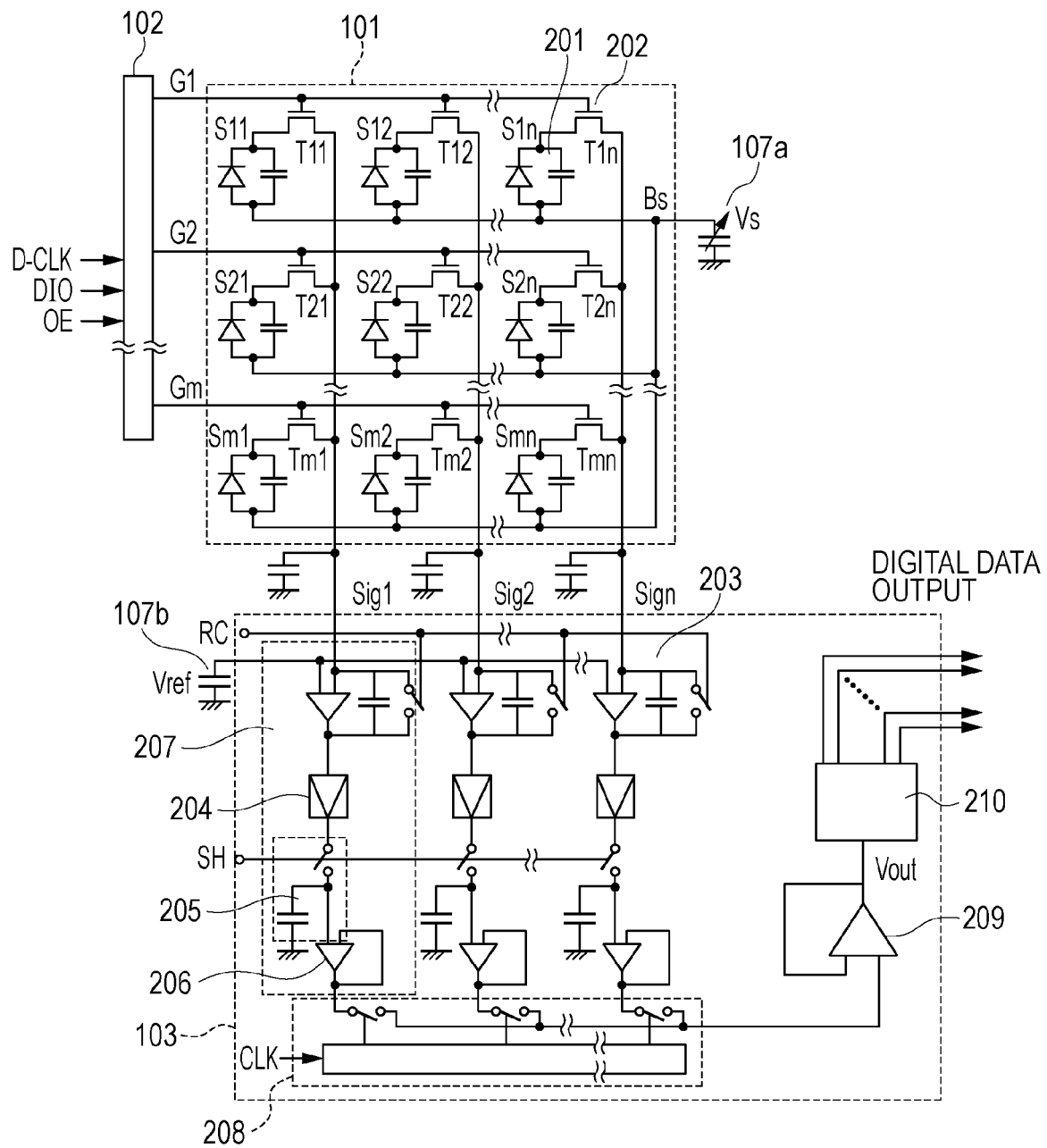
FIG. 4 is a schematic equivalent circuit diagram of the image pickup apparatus according to the present invention.

Next, an image pickup apparatus according to the present embodiment will be described with reference to FIG. 4. It is to be noted that the same configurations as those described above are given the same reference numerals, and detailed description thereof is omitted.

The detection unit 101 includes a plurality of pixels arranged in a matrix. Each pixel includes a conversion element 201 that converts radiation or light into charge and a switching element 202 that outputs an electrical signal according to the charge. As each conversion element, an indirect conversion element including a photoelectric conversion element that converts light into charge and a wavelength conversion member that converts radiation incident on a radiation incident side of the photoelectric conversion element into light in a wavelength band that can be detected by the photoelectric conversion element or a direct conversion element that directly converts radiation into charge may be properly used. In the present embodiment, a PIN photodiode that is mainly composed of amorphous silicon and that is provided on an insulating substrate such as a glass substrate is used as a photodiode, which is a type of photoelectric conversion element. As each switching element 202, a transistor including a control terminal and two main terminals may be properly used, and, in the present embodiment, a thin-film transistor (TFT) is used. One electrode (a first electrode) of each conversion element 201 is electrically connected to one of the two main terminals of each switching element 202, and another electrode (a second electrode) is electrically connected to a first power supply 107a through a common bias wire Bs. The control terminals of a plurality of switching elements in a row direction, namely, for example, switching elements T11 to T1n, are electrically connected to a drive wire G1 in a first row in common, and driving signals for controlling the open/closed states of the switching elements are provided from the drive circuit 102 row by row through the drive wire. The other main terminals of a plurality of switching elements 202 in a column direction, namely, for example, switching elements T11 to Tm1, are electrically connected to a signal wire Sig1 in a first column, and while the switching elements are closed, electrical signals according to the charges of the conversion elements are output to the read circuit 103 through the signal wire. A plurality of signal wires Sig1 to Sign arranged in the column direction transmit electrical signals output from the plurality of pixels to the read circuit 103 parallel to one another.

In the read circuit 103, an amplification circuit 207 that amplifies an electrical signal output from the detection unit 101 parallel to other electrical signals is provided for each signal wire. In addition, each amplification circuit 207 includes an integrating amplifier 203 that amplifies the output electrical signal, a variable amplifier 204 that amplifies the electrical signal from the integrating amplifier 203, a sample-and-hold circuit 205 that samples and holds the amplified electrical signal, and a buffer amplifier 206. The integrating amplifier 203 includes an operational amplifier that amplifies and outputs a read electrical signal, an integrating capacitor, and a reset switch. The output electrical signal is input to an inverting input terminal of the operational amplifier, a reference potential Vref is input to a non-inverting input terminal from a second power supply 107b, and an output terminal outputs an amplified electrical signal. In addition, the integrating capacitor is provided between the inverting input terminal and the output terminal of the operational amplifier. The sample-and-hold circuit 205 is provided for each amplification circuit and includes a sampling switch and a sampling capacitor. The read circuit 103 also includes a multiplexer 208 that sequentially outputs electrical signals read from the amplification circuits 207 parallel to one another and that outputs the electrical signals as image signals of serial signals and a buffer amplifier 209 that executes impedance conversion on the image signals and outputs the image signals. An image signal Vout, which is an analog electrical signal output from the buffer amplifier 209, is converted into digital image data by an A/D convertor 210 and output to the signal processing unit 105, and the image data processed by the signal processing unit 105 is output to the control computer 108.

The drive circuit 102 outputs, to each drive wire, a driving signal including closing voltage Von for causing the switching elements to close and opening voltage Voff for causing the switching elements to open in accordance with control signals (D-CLK, OE, and DIO) input from the control unit 106. In doing so, the drive circuit 102 controls the closed state and the on state of the switching elements and drives the detection unit 101.

The control unit 106 receives control signals from the control computer 108 through the signal processing unit 105 and controls the operation of the detector 104 by providing various control signals for the drive circuit 102, the power supply unit 107, and the read circuit 103. The control unit 106 controls the operation of the drive circuit 102 by providing the control signal D-CLK, the control signal OE, and the control signal DIO for the drive circuit 102. Here, D-CLK is a shift clock for a shift register used as the drive circuit, DIO is a pulse transferred by the shift register, and OE controls an output end of the shift register. In addition, the control unit 106 controls the operation of each component of the read circuit 103 by providing a control signal RC, a control signal SH, and a control signal CLK for the read circuit 103. Here, RC is a control signal that controls the operation of the reset switches of the integrating amplifiers, SH is a control signal that controls the operation of the sample-and-hold circuits 205, and CLK is a control signal that controls the operation of the multiplexer 208.

The power supply unit 107 includes the first power supply 107a and the second power supply 107b. The first power supply 107a supplies a potential Vs to the second electrode of each conversion element in common through the bias wire Bs. The second power supply 107b supplies the reference potential Vref to the non-inverting input terminal of each operational amplifier. When the switching elements are closed, the reference potential Vref is supplied to the first electrodes of the conversion elements 201 through the signal wires Sig1 to Sign and the switching elements 202. It is to be noted that the first power supply 107a according to the present embodiment is a variable power supply that can switch at least between a first potential Vs1 and a second potential Vs2 and supply the first potential Vs1 or the second potential Vs2 to the pixels of the detection unit 101. However, the present invention is not limited to this, and the second power supply 107b may be a variable power supply that can switch at least between a first reference potential Vref1 and a second reference potential Vref2 and supply the first reference potential Vref1 or the second reference potential Vref2.

Figure 5A:
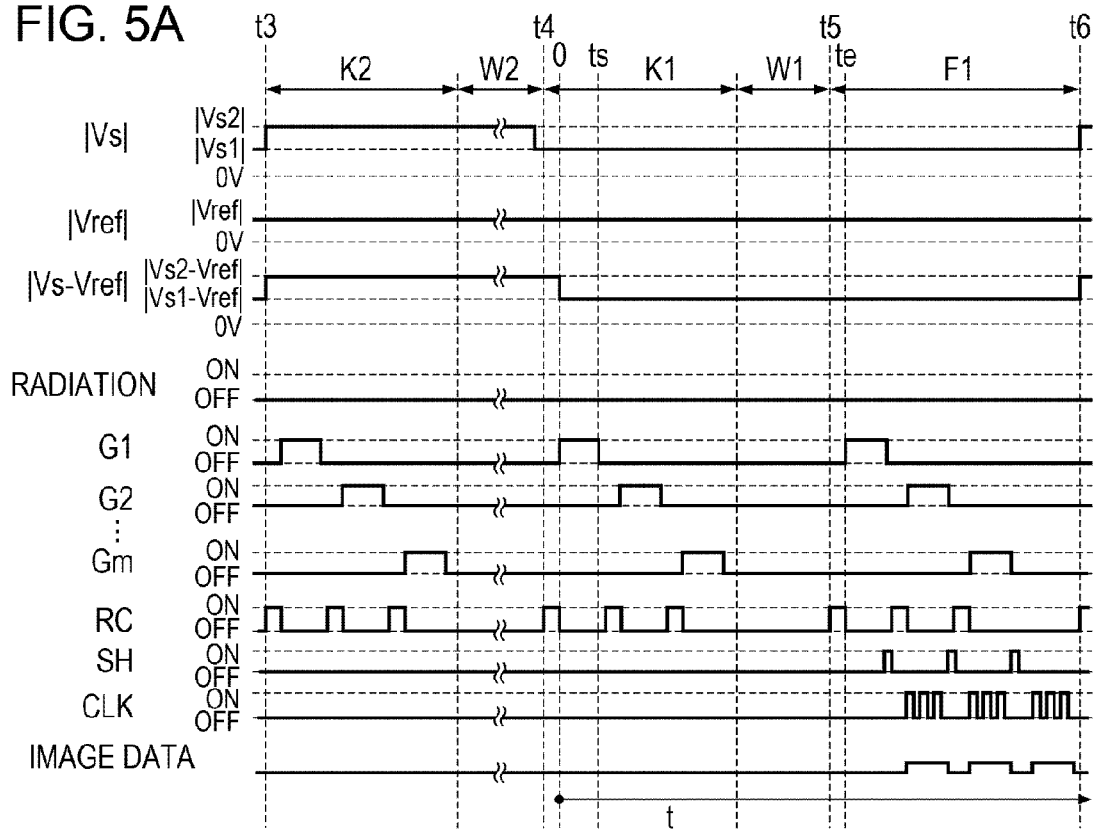
FIG. 5A is a timing chart of the image pickup apparatus according to the present invention.
Figure 5B:
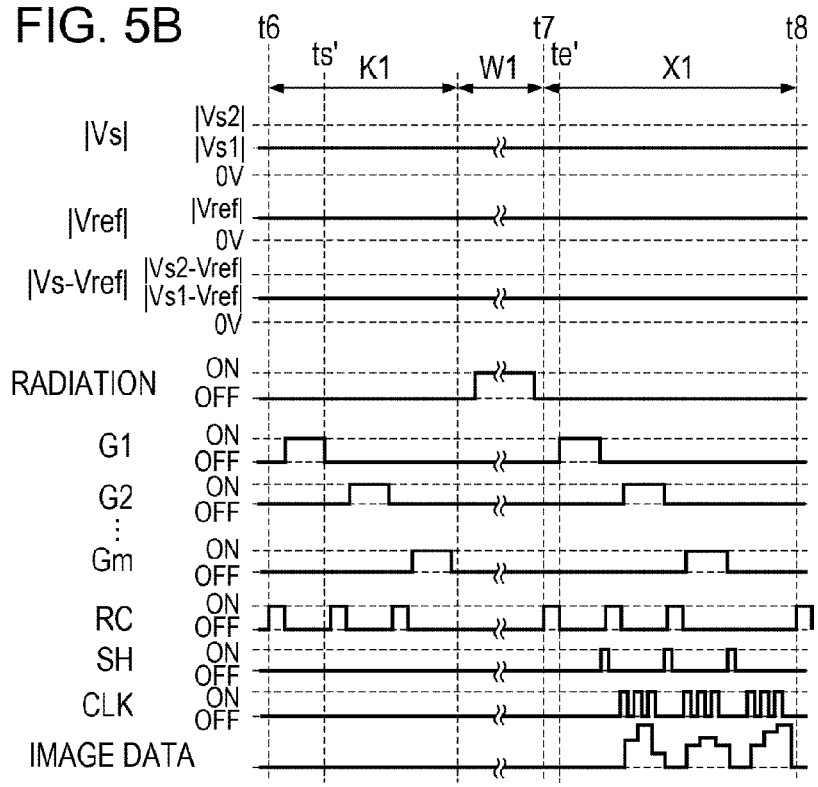
FIG. 5B is a timing chart of the image pickup apparatus according to the present invention.

Next, the operation of the image pickup apparatus in the present invention will be described with reference to FIG. 1, FIG. 5A, and FIG. 5B. Here, FIG. 5A illustrates an A-A' portion of FIG. 1 in detail, and FIG. 5B illustrates a B-B' portion of FIG. 1 in detail.

As illustrated in FIG. 1, when the first potential Vs1 has been applied to a conversion element 201 at a time t1, the image pickup apparatus 100 executes an image pickup preparation operation during an image pickup preparation period. Here, the image pickup preparation operation is an operation in which an initialization operation K is performed at least once in order to stabilize noise in the detector 104 due to the beginning of the application of the first potential Vs1, and, in this embodiment, an initialization operation K1 is repeatedly performed a plurality of times. It is to be noted that when variation in the characteristics of the detector 104 is stable, the image pickup preparation operation need not be performed. Here, the initialization operation is an operation for closing a plurality of switching elements in the detection unit sequentially row by row or in a plurality of rows at a time performed separately from an image output operation and the offset obtaining operation, which will be described later, in order to initialize the conversion elements in the detection unit by applying a desired voltage. The initialization operation K1 according to the present embodiment is realized by applying an initial voltage before an accumulation operation, that is, a first voltage |Vs1−Vref|, to the conversion elements. It is to be noted that, in FIG. 1, a combination between the initialization operation K1 and an accumulation operation W1 is repeatedly performed a plurality of times as the image pickup preparation operation. It is to be noted that, in the present invention, the accumulation operation is an operation for accumulating charges in the conversion elements and, in the present embodiment, is realized when all the switching elements in a plurality of pixels are open.

Next, at a time t2, which comes when a certain period of time has elapsed since the time t1, the image pickup apparatus 100 begins the first image pickup operation. In an image pickup period from the time t2 to a time t3, the image pickup apparatus 100 executes the initialization operation K1, the accumulation operation W1, and an image output operation X1. In the image pickup operation, the accumulation operation W1 is an accumulation operation performed in a period according to radiation of radiation for the conversion elements to generate charges, and the image output operation X1 is an operation for outputting image data (image signals) on the basis of electrical signals according to the charges generated in the accumulation operation W1. Here, in the present embodiment, although the accumulation operation in each image pickup operation is performed for the same period of time as a period of time for which the accumulation operation is performed in the image pickup preparation operation, but the present invention is not limited to this. In order to shorten the image pickup preparation operation, it is preferable that the period of time for which the accumulation operation is performed in the image pickup preparation operation is shorter than the period of time for which the accumulation operation is performed in the image pickup operation. In addition, in the present embodiment, although the initialization operation in the image pickup operation is performed for the same period of time as a period of time for which the initialization operation is performed in the image pickup preparation operation, the present invention is not limited to this. In order to shorten the image pickup preparation operation, it is preferable that the period of time for which the initialization operation is performed in the image pickup preparation operation is shorter than the period of time for which the initialization operation is performed in the image pickup operation.

Next, when the first image pickup operation has been completed at the time t3, the image pickup apparatus 100 executes the inter-image pickup operation until a time t6, at which a next image pickup operation (the second image pickup operation) begins. The inter-image pickup operation includes the lag suppression operation performed from the time t3 and the offset obtaining operation performed from a time t5 to the time t6.

In the lag suppression operation performed from the time t3, a second voltage |Vs2−Vref| is applied to the conversion elements 201 and at least an initialization operation K2 is performed. It is to be noted that, in the present embodiment, the initialization operation K2 and an accumulation operation W2 are performed in the lag suppression operation. More specifically, as illustrated in FIG. 5A, in the initialization operation K2, the control unit 106 provides a control signal for the power supply unit 107, and the power supply unit 107 applies the second potential Vs2 to the second electrodes of the conversion elements 201. On the other hand, the control unit 106 provides the control signal RC for the reset switches, and the integrating capacitors and the signal wires of the integrating amplifiers 203 are reset. Therefore, the potential of the signal wires becomes the reference potential Vref. Next, the control unit 106 provides the control signal D-CLK, the control signal OE, and the control signal DIO for the drive circuit 102. In doing so, the drive circuit 102 supplies the closing voltage Von to the control terminals of the switching elements 202, and the second voltage |Vs2−Vref| is applied to the conversion elements 201. Next, the drive circuit 102 supplies the opening voltage Voff to the control terminals of the switching elements 202, and the conversion elements 201 are kept at the second voltage |Vs2−Vref|. By repeating such control of the open/closed state of the switching elements and resetting up to an m-th row, the initialization operation K2 for the detector 104 is realized. Thereafter, by keeping the open state of the switching elements in accordance with the control signal D-CLK, the control signal OE, and the control signal DIO, the accumulation operation W2 is performed.

Next, before the offset obtaining operation performed from the time t5 to the time t6, first, the initialization operation K1 is performed from a time t4 in order to apply the first voltage |Vs1−Vref| to the conversion elements 201. When the initialization operation K1 has begun, the lag suppression operation is completed. More specifically, as illustrated in FIG. 5A, in the initialization operation K1, the control unit 106 provides a control signal for the power supply unit 107, and the power supply unit 107 applies the first potential Vs1 to the second electrodes of the conversion elements 201. On the other hand, the control unit 106 provides the control signal RC for the reset switches, and the integrating capacitors and the signal wires of the integrating amplifiers 203 are reset. Therefore, the potential of the signal wires becomes the reference potential Vref. Next, the control unit 106 provides the control signal D-CLK, the control signal OE, and the control signal DIO for the drive circuit 102. In doing so, the drive circuit 102 supplies the closing voltage Von to the control terminals of the switching elements 202, and the first voltage |Vs1−Vref| is applied to the conversion elements 201. Thus, the lag suppression operation is completed. Next, the drive circuit 102 supplies the opening voltage Voff to the control terminals of the switching elements 202, and the conversion elements 201 are kept at the first voltage |Vs1−Vref|. In doing so, the conversion elements 201 begin to accumulate charges. This accumulation of charges corresponds to offset data (dark signals) obtained in an offset obtaining operation F1, which will be described later. By repeating such control of the open/closed states of the switching elements and resetting up to the m-th row, the initialization operation K1 for the detector 104 is realized. Here, the period calculation unit 122 detects the time (charge accumulation beginning time) is until the conversion elements begin to accumulate charges after the lag suppression operation is completed on the basis of the control signal D-CLK, the control signal OE, and the control signal DIO output from the control unit 106. It is to be noted that the initialization operation K1 described herein may be performed a plurality of times, and, in that case, the time is detected in the initialization operation K1 performed immediately before the offset obtaining operation F1, which will be described later. Thereafter, by keeping the closed state of the switching elements in accordance with the control signal D-CLK, the control signal OE, and the control signal DIO, the accumulation operation W1 is performed. Next, at the time t5 after the accumulation operation W1 is performed for the same period of time as a period of time for which the accumulation operation W1 is performed in the image pickup operation, the offset obtaining operation F1, in which the offset data (the dark signals) is output on the basis of the charges generated in the accumulation operation W1, is performed. The offset obtaining operation F1 is performed in order to obtain electrical signals based on the charges generated by the conversion elements in a dark state, in which radiation is not radiated. In the offset obtaining operation F1, the same operation as the image output operation X1 is performed in the image pickup apparatus 100. More specifically, as illustrated in FIG. 5A, in the offset obtaining operation F1, first, the control unit 106 outputs the control signal RC, and the integrating capacitors and the signal wires are reset. Next, the drive circuit 102 applies the closing voltage Von to the drive wire G1, and the switching elements T11 to T1n in the first row are closed. Thus, the conversion elements 201 terminate the accumulation of charges, and electrical signals based on the charges generated in conversion elements S11 to Sin in the first row are output to the signal wires. The electrical signals output through the signal wires parallel to one another are amplified by the integrating amplifiers 203 and the variable amplifiers 204 in the respective amplification circuits 207. The sample-and-hold circuits are operated by the control signal SH, and the amplified electrical signals are held by the sample-and-hold circuits 205 in the amplification circuits 207 parallel to one another. After the holding, the control unit 106 outputs the control signal RC, and the integrating capacitors and the signal wires of the integrating amplifiers 203 are reset. After the resetting, the closing voltage Vcom is applied to a drive wire G2 in a second row as in the case of the first row, and switching elements T21 to T2n in the second row are closed. In a period in which the switching elements T21 to T2n in the second row are closed, the multiplexer 208 sequentially outputs the electrical signals held by the sample-and-hold circuits 205. In doing so, the electrical signals from the pixels in the first row that have been read parallel to one another are converted into serial image signals and output, and the A/D converter 210 converts the serial image signals into offset data (the amount of offset) of one row and outputs the offset data. By performing the above operation row by row from the first row to the m-th row, offset data of one frame is output from the detector 104.

The output offset data is stored in the first storage unit 121. In addition, the period calculation unit 122 detects the time (charge accumulation end time) te at which the conversion elements 201 end the accumulation of charges, which is the second time until the offset obtaining operation begins after the lag suppression operation is completed, on the basis of the control signal D-CLK, the control signal OE, and the control signal DIO output from the control unit 106. The period calculation unit 122 then transmits the charge accumulation beginning time ts and the beginning time te of the offset obtaining operation that have been detected and the offset data to the correction coefficient calculation unit 123. The correction coefficient calculation unit 123 then calculates a correction coefficient on the basis of the time ts, the time te, and dark image data. It is to be noted that the calculation of the correction coefficient will be described in detail later.

Next, at the time t6, the image pickup apparatus 100 begins the second image pickup operation. In a second image pickup period from the time t6 to a time t8, the image pickup apparatus 100 executes, as in the first image pickup operation, the initialization operation K1 and the accumulation operation W1 from the time t6 to a time t7 and the image output operation X1 from the time t7 to the time t8. More specifically, as illustrated in FIG. 5B, in the image output operation X1 that begins at the time t7 after the accumulation operation, first, the control unit 106 outputs the control signal RC and the integrating capacitors and the signal wires are reset. Next, the drive circuit 102 applies the closing voltage Von to the drive wire G1, and the switching elements T11 to T1n in the first row are closed. Therefore, the electrical signals based on the charges generated in the conversion elements S11 to S1n in the first row are output to the signal wires. The electrical signals output through the signal wires parallel to one another are amplified by the integrating amplifiers 203 and the variable amplifiers 204 in the respective amplification circuits 207. The sample-and-hold circuits are operated by the control signal SH, and the amplified electrical signals are held by the sample-and-hold circuits 205 in the amplification circuits 207 parallel to one another. After the holding, the control unit 106 outputs the control signal RC, and the integrating capacitors and the signal wires of the integrating amplifiers 203 are reset. After the resetting, the closing voltage Vcom is applied to the drive wire G2 in the second row as in the case of the first row, and the switching elements T21 to T2n in the second row are closed. In the period in which the switching elements T21 to T2n in the second row are closed, the multiplexer 208 sequentially outputs the electrical signals held by the sample-and-hold circuits 205. In doing so, the electrical signals from the pixels in the first row that have been read parallel to one another are converted into serial image signals and output, and the A/D converter 210 converts the serial image signals into image data of one row and outputs the image data. By performing the above operation row by row from the first row to the m-th row, image data of one frame is output from the detector 104.

The output image data is stored in the second storage unit 124. In addition, the period calculation unit 122 detects the charge accumulation beginning time ts' until the conversion elements begin to accumulate charges after the lag suppression operation is completed in the second image pickup operation, which is the third time, on the basis of the control signal D-CLK, the control signal OE, and the control signal DIO output from the control unit 106. In addition, the period calculation unit 122 detects the charge accumulation end time te' until the operation for outputting an image signal begins after the lag suppression operation is completed in the second image pickup operation, which is the fourth time, on the basis of the control signal D-CLK, the control signal OE, and the control signal DIO output from the control unit 106. The period calculation unit 122 then transmits the charge accumulation beginning time ts' and the charge accumulation end time te' in the second image pickup operation that have been detected and the correction coefficient calculated by the correction coefficient calculation unit 123 to the offset amount prediction unit 125. The offset amount prediction unit 125 then calculates a predictive value of the amount of offset that can be included in the image data obtained in the second image pickup operation on the basis of the third time ts', the fourth time te', and the correction coefficient. It is to be noted that the calculation of the predictive value will be described in detail later. Next, the arithmetic unit 126 subtracts the calculated predictive value of the amount of offset from the image data stored in the second storage unit 124 and generates a corrected image data.

Next, the calculation of the correction coefficient and the calculation of the predictive value of the amount of offset will be described. The offset data obtained in the offset obtaining operation, which is performed from the time t5 to the time t6 in FIG. 5A, includes a component that changes over time and a component that does not depend on the time lapse as illustrated in FIG. 2C. When the offset data is denoted by D, the component that attenuates over time is denoted by A(t), and the component that does not depend on the time lapse is denoted by B, the offset data D can be represented by the following expression (1).

$$D = \int A(t) + B \quad (1)$$

Here, the offset data obtained in the offset obtaining operation is an amount of charge accumulated in the conversion elements in a period from the time ts to the time te in which the initialization operation K1 and the accumulation operation W1 are performed. In addition, it has been found that the component A(t) that attenuates over time is proportional to the reciprocal of a reciprocal t of the time that has elapsed since the lag suppression operation was completed. Therefore, the expression (1) can approximate the following expression (2).

$$D \approx \alpha \int_{t_s}^{t_e} t^{-1} dt + \beta = \alpha \ln \frac{t_e}{t_s} + \beta \quad (2)$$

That is, if the offset data obtained in the offset obtaining operation, the time ts, and the time te are identified, a first correction coefficient α and a second correction coefficient β can be calculated as correction coefficients in the expression (2).

However, to have the two correction coefficients to be calculated means that two types of offset data, time ts, and time te are needed, and therefore the offset obtaining operation needs to be performed twice. If the offset obtaining operation is performed twice, periods between the plurality of image pickup operations to be performed undesirably become long. Therefore, a method for calculating the first correction coefficient α and the second correction coefficient β from the offset data of one image obtained in one offset obtaining operation will be described with reference to FIG. 7.

In the detection unit 101, the plurality of pixels are arranged in a matrix, and control of the operation of the switching elements are performed row by row. When the column direction is denoted by x and the row direction is denoted by y, offset data regarding pixels of x columns and y rows is represented by D(x, y). Similarly, correction coefficients for the pixels of the x columns and the y rows are represented by α(x, y) and β(x, y), respectively. However, since the time ts and the time te are different between the rows by certain periods, the time ts and the time te need to be a time ts(y) and a time te(y), respectively. As a result, by applying the expression (2) to each pixel, the following expression (3) is obtained.

$$D(x, y) \approx \alpha(x, y)\ln\frac{t_e(y)}{t_s(y)} + \beta(x, y) \quad (3)$$

Here, as a result of experiments, the present inventor has found that variation in the second correction coefficient β between the pixels is large, but variation in the first correction coefficient α between the pixels is small. It has also been found that variation in the second correction coefficient β between the amplification circuits 207 is large, but variation is relatively small between the pixels connected to one amplification circuit 207 in common. Therefore, it can be assumed that the first correction coefficient α is the same in all the pixels and the second correction coefficient β is the same in pixels in an x1-th column and a y1-th row and pixels in the x1-th column and a y2-th row, and the first coefficient α and the second correction coefficient β can be represented by an expression (4).

$$\alpha(x_1,y_1)=\alpha(x_1,y_2)=\alpha(x,y)=\alpha\beta(x_1,y_1)=\beta(x_1,y_2) \quad (4)$$

Next, by applying the expression (4), offset data D(x1, y1) regarding the pixels in the x1-th column and the y1-th row, and offset data D(x1, y2) regarding the pixels in the x1-th column and the y2-th row to the expression (3) in which the pixels in the x1-th column and the y1-th row and the pixels in the x1-th column and the y2-th row are used, the following expression (5) is obtained.

$$\alpha \approx \{D(x_1, y_1) - D(x_1, y_2)\}/\ln\frac{t_e(y_1)*t_s(y_2)}{t_s(y_1)*t_e(y_2)} \quad (5)$$

When the first correction coefficient α(x, y) for the pixels of the x columns and the y rows has been obtained by the expression (5), the second correction coefficient β(x, y) for the pixels of the x columns and the y rows can be obtained by applying the first correction coefficient α(x, y) to the following expression (6), which is obtained by expanding the expression (3).

$$\beta(x, y) \approx D(x, y) - \alpha\ln\frac{t_e(y)}{t_s(y)} \quad (6)$$

However, the present invention does not exclude an assumption that the second offset correction coefficient β is the same in all the pixels and the first correction coefficient α is the same in the pixels in the x1-th column and the y1-th row and the pixels in the x1-th column and the y2-th row. In addition, when not a certain pixel but average offset data regarding pixels around the certain pixel is used as the offset data D, the approximation accuracy of the correction coefficients further improves.

Next, an predicted amount of offset Dpre at the time te' is calculated by the following expression (7).

$$D_{pre}(x, y) \approx \alpha\ln\frac{t'_e(y)}{t'_s(y)} + \beta(x, y) \quad (7)$$

Corrected image data can be generated by subtracting the amount of offset Dpre calculated by the expression (7) from data X regarding each pixel that configures the image data obtained in the second image pickup operation.

It is to be noted that, in the present embodiment, the period calculation unit 122 calculates a time that has elapsed since the lag suppression operation was completed on the basis of the control signal D-CLK, the control signal OE, and the control signal DIO output from the control unit 106. However, the present invention is not limited to this, and the time can be properly calculated on the basis of the control signal RC. In order to calculate the time more accurately, it is preferable that the calculation is based on the control signal D-CLK, the control signal OE, and the control signal DIO. However, because a period for which the closing voltage Von is supplied to the drive wire G1 is short, namely about one-thousandth of the period of the initialization and the period of the accumulation operation, no problem arises even if the time is calculated on the basis of the control signal RC. In addition, when the time elapsed since the lag suppression operation was completed is to be calculated, a time at which the potential Vs supplied by the first power supply 107a to the second electrode of each conversion element through the bias wire Bs is reset from Vs2 to Vs1 may be regarded as the beginning.

Alternatively, in the inter-image pickup operation, the offset obtaining operation may be performed twice or more. Furthermore, in the inter-image pickup operation, the offset obtaining operation may be performed twice or more such that the lag suppression operation is performed therebetween. Thus, by performing the offset obtaining operation twice or more and by using the obtained offset data for the arithmetic processing, the prediction accuracy and the correction accuracy can be further improved.

In addition, it is also preferable to perform the offset obtaining operation after the second image pickup operation and apply the correction coefficient to data obtained in the offset obtaining operation. In such a case, a difference in image pickup time between offset data Dpost obtained after the second image pickup operation and the image data obtained in the second image pickup operation is small compared to offset data obtained before the second image pickup operation. That is, a difference in the offset component that depends on time is small. Therefore, there may be a method in which after the offset data obtained after the second image pickup operation is subtracted from the image data obtained in the second image pickup operation, the offset component caused by a difference in image pickup time between the two is corrected using the calculated offset correction coefficient. When times at which radiation images are obtained are denoted by $t_{s\_x}$ and $t_{s\_x}$ and times at which dark images are obtained immediately after the corresponding radiation images are obtained are denoted by $t_{s\_post}$ and $t_{e\_post}$, a radiation image $X_{post}(x, y)$ after the offset correction in a third implementation mode is represented by the following expression.

$$X_{post}(x, y) = X(x, y) - D_{post}(x, y) - \alpha(x, y)\ln\frac{t_{e\_x}(y)*t_{s\_post}(y)}{t_{s\_x}(y)*t_{e\_post}(y)} \quad (8)$$

However, the offset data Dpost(x, y) includes a lag component in the second image pickup operation. Nevertheless, because there is a correlation between the image data X(x, y) obtained in the second image pickup operation and the lag component included in the offset data Dpost(x, y), no gap is generated in the corrected image data.

In addition, it is preferable that the correction coefficient calculation unit 123 has a configuration in which the calculated correction coefficient can be stored and updated. Thus, by using an updated correction coefficient, the prediction accuracy and the correction accuracy can be further improved.

In addition, although a PIN photodiode has been used to describe the photoelectric conversion element in the present embodiment, the present invention is not limited to this. For example, an MIS sensor described in Japanese Patent Laid-Open No. 09-294229, Japanese Patent Laid-Open No. 2007-035773, Japanese Patent Laid-Open No. 2011-091771, or the like may be used, instead.

Figure 6:
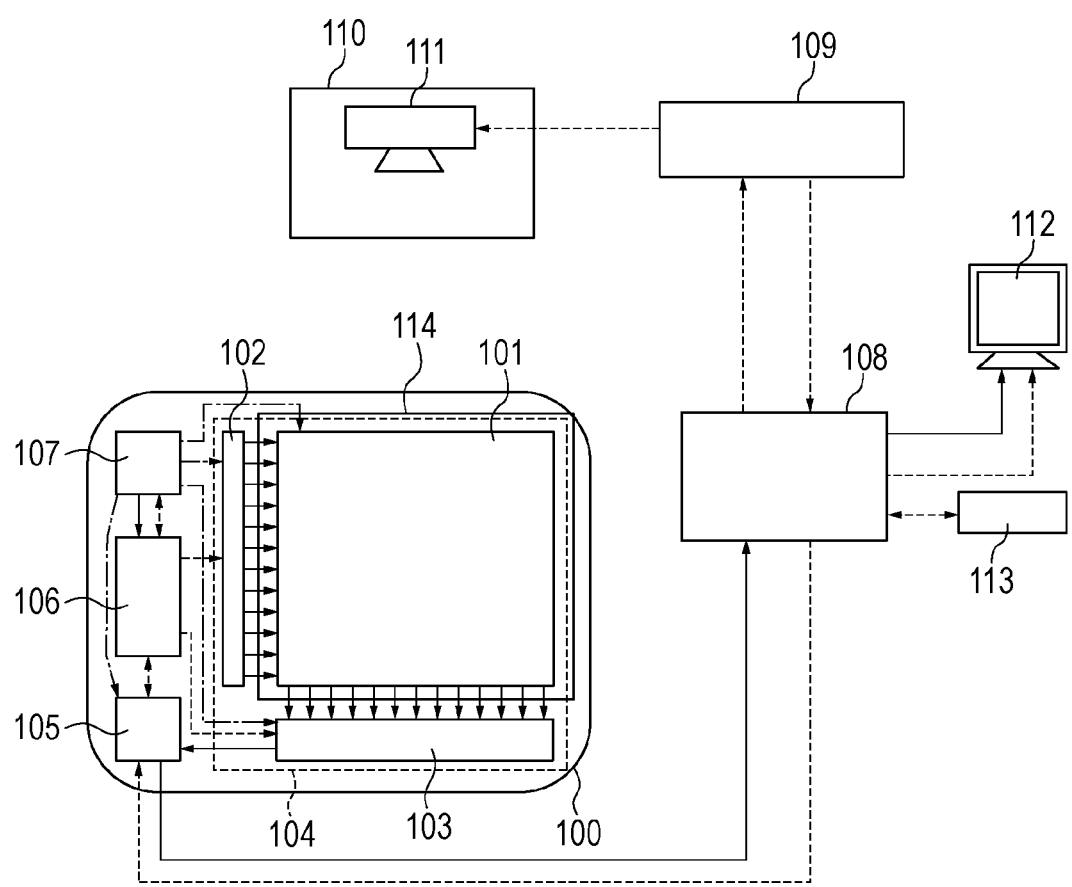
FIG. 6 is a schematic block diagram of another example of the image pickup system according to the present invention.
Figure 7:
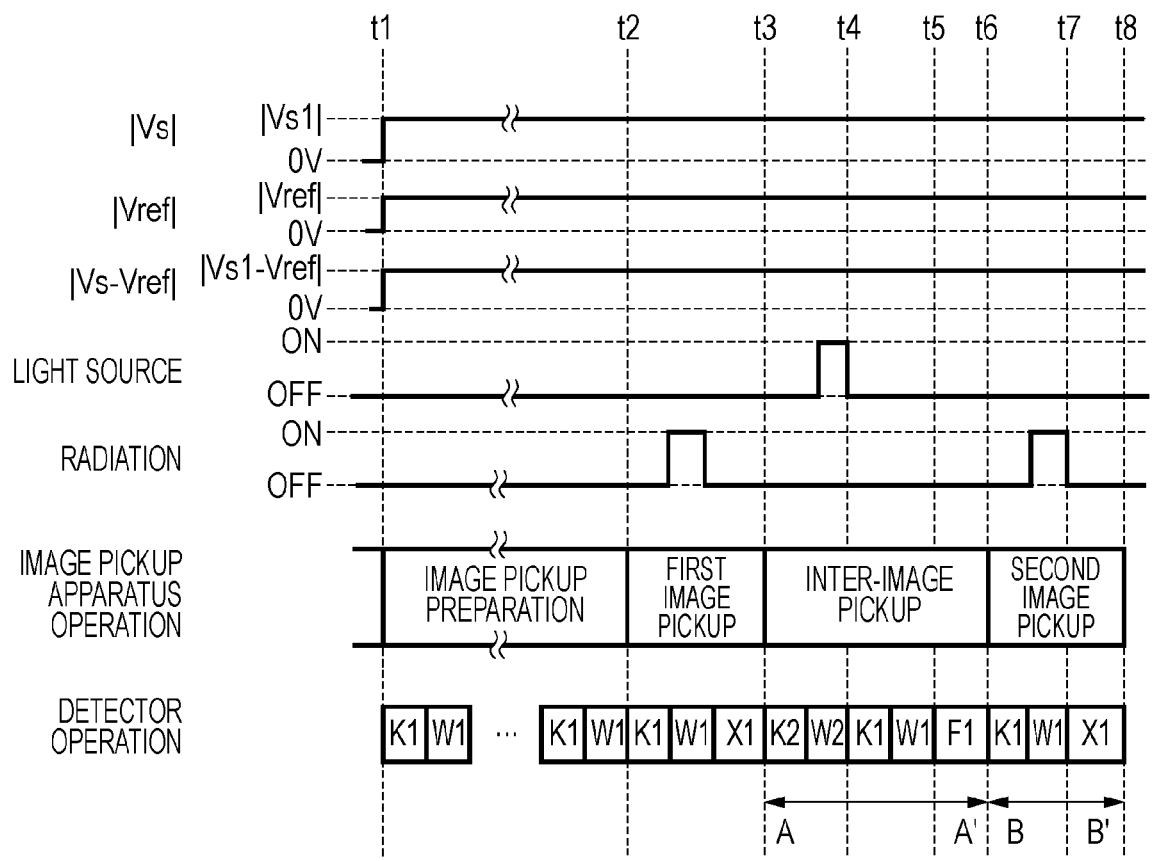
FIG. 7 is a timing chart of the other example of the image pickup apparatus according to the present invention.
Figure 8A:
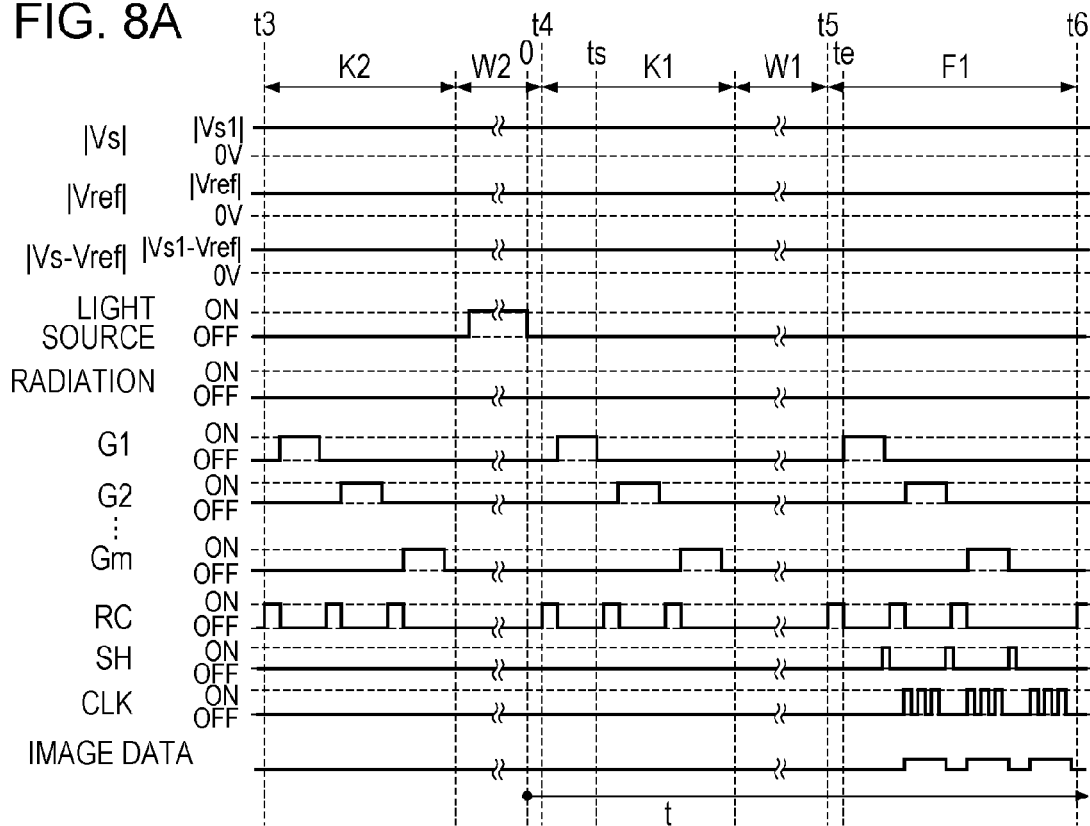
FIG. 8A is a timing chart of the other example of the image pickup apparatus according to the present invention.
Figure 8B:
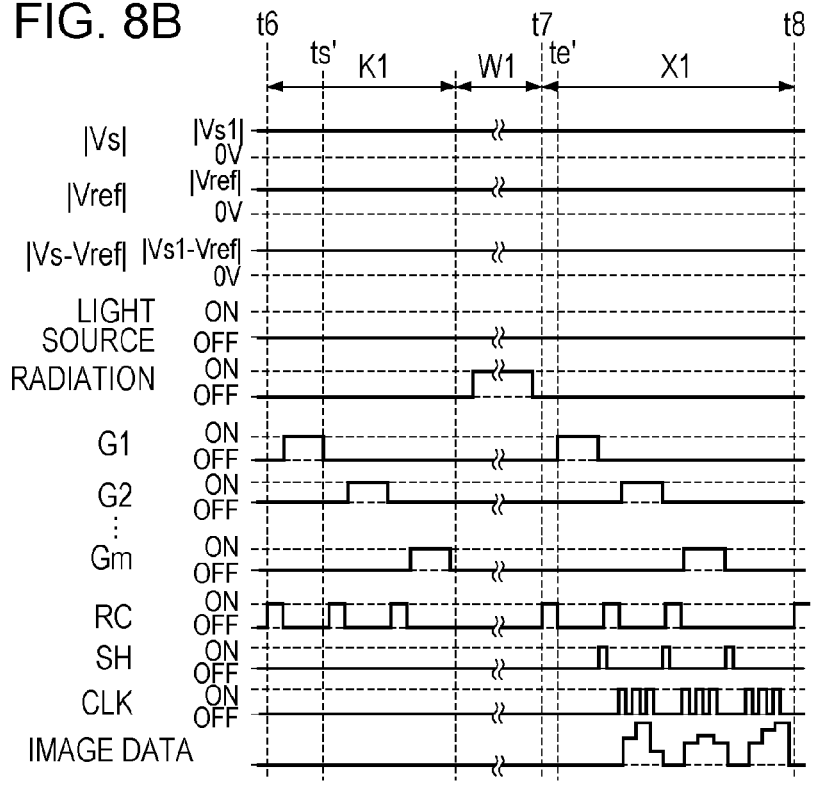
FIG. 8B is a timing chart of the other example of the image pickup apparatus according to the present invention.

In addition, although the operation for applying the second voltage, which is different from the first voltage for depleting a semiconductor layer, to the conversion element has been used to describe the lag suppression operation in the present embodiment, the present invention is not limited to this. As illustrated in FIG. 6, another lag suppression operation may be performed in which a light source 114 is included at a position from which light can be radiated onto the conversion elements 201 in the image pickup apparatus 100 and a lag is suppressed by radiating light onto the conversion elements 201 using the light source 114. In this another lag suppression operation, as illustrated in FIG. 7, the light source 114 is controlled by the control unit 106 such that the light source 114 radiates light onto the detection unit 101 in a period in which at least an accumulation operation is performed in this another lag suppression operation. As illustrated in FIGS. 7, 8A, and 8B, the operation may be the same as the operation according to the present embodiment except that the light source 114 radiates light onto the detection unit 101 instead of applying the second voltage to the conversion elements. However, in this case, the beginning of each period is the end of the radiation of light using the light source.

In addition, although the configuration in which the signal processing unit 105 includes the first storage unit 121, the period calculation unit 122, the correction coefficient calculation unit 123, the second storage unit 124, the offset amount prediction unit 125, and the arithmetic unit 126 has been described in the present embodiment, the present invention is not limited to this. The first storage unit 121, the period calculation unit 122, the correction coefficient calculation unit 123, the second storage unit 124, the offset amount prediction unit 125, and the arithmetic unit 126 may be included in the control computer 108.

It is to be noted that the present invention can be realized, for example, by executing a program using a computer included in the control unit 106 or the control computer 108. In addition, means for supplying the program to the computer, that is, for example, a computer-readable recording medium on which the program is recorded, such as a CD-ROM, or a transmission medium for transmitting the program, such as the Internet, may be applied as embodiments of the present invention. In addition, the program may also be applied as an embodiment of the present invention. The program, the recording medium, the transmission medium, and a program product are included in the category of the present invention. In addition, inventions including combinations that can be easily imagined from the present embodiment are also included in the category of the present invention.

According to the present invention, an image pickup apparatus that can suppress a lag with short image pickup intervals and that can obtain an image of a desirable S/N ratio can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2011/080371, filed Dec. 28, 2011, which is hereby incorporated by reference herein in its entirety.

The invention claimed is:

1. An image pickup apparatus comprising:
a detector that includes a plurality of conversion elements which convert radiation into charge and that executes image pickup operations in which electrical signals based on the charge are output;
a control unit that controls the detector such that the detector executes, in a period between a first image pickup operation and a second image pickup operation, which is executed after the first image pickup operation, among the image pickup operations that are performed a plurality of times, inter-image pickup operations including a first inter-image pickup operation for suppressing a lag generated by the first image pickup operation and a second inter-image pickup operation for obtaining, from the detector, dark signals based on charges included in the conversion elements that are in a state in which the radiation is not radiated after the first inter-image pickup operation; and
a signal processing unit that executes arithmetic processing on the electrical signals output from the detector,
wherein the signal processing unit
calculates a correction coefficient using a first time until the conversion elements begin to accumulate charges for the second inter-image pickup operation after the first inter-image pickup operation is completed, a second time until the second inter-image pickup operation begins after the first inter-image pickup operation is completed, and the dark signals,
predicts an amount of offset to be included in electrical signals output from the detector in the second image pickup operation using a third time until the conversion elements begin to accumulate charges for the second image pickup operation after the first inter-image pickup operation is completed, a fourth time until an operation for outputting the electrical signals begins in the second image pickup operation after the first inter-image pickup operation is completed, and the correction coefficient, and
executes calculation using the electrical signals and the amount of offset output from the detector in the second image pickup operation.

2. The image pickup apparatus according to claim 1, wherein the signal processing unit includes a period calculation unit that calculates the times on the basis of control signals output from the control unit to the detector, a correction coefficient calculation unit that calculates the correction coefficient using the first time, the second time, and the dark signals, a prediction unit that predicts the amount of offset using the third time, the fourth time, and the correction coefficient, and an arithmetic unit that subtracts the amount of offset from the electrical signals output from the detector in the second image pickup operation.

3. The image pickup apparatus according to claim 2, wherein the correction coefficient includes a first correction coefficient and a second correction coefficient, and wherein, when the dark signals are denoted by D, the first time is denoted by ts, the second time is denoted by te, time elapsed since the first inter-image pickup operation was completed is denoted by t, the first correction coefficient is denoted by α, and the second correction coefficient is denoted by β, the correction coefficient calculation unit calculates the first correction coefficient and the second correction coefficient on the basis of a following expression:

$$D \approx \alpha \int_{ts}^{te} t^{-1} dt + \beta = \alpha \ln \frac{t_e}{t_s} + \beta.$$

4. The image pickup apparatus according to claim 3, wherein the detector includes a detection unit in which a plurality of pixels including the conversion elements and switching elements connected to the first electrodes are arranged in a matrix and a drive circuit that closes the switching elements in order to output the electrical signals from the detection unit row by row,
wherein the control unit outputs a control signal to the drive circuit, and
wherein the period calculation unit calculates the first time on the basis of the control signal output from the control unit to the drive circuit.

5. The image pickup apparatus according to claim 4, wherein, when the first time in pixels in an x1-th column and a y1-th row is denoted by ts(y1), the first time in pixels in the x1-th column and a y2-th row is denoted by ts(y2), the second time in the pixels in the x1-th column and the y1-th row is denoted by te(y1), the second time in the pixels in the x1-th column and the y2-th row is denoted by te(y2), the dark signals in the x1-th column and the y1-th row are denoted by D(x1, y1), and the dark signals in the pixels in the x1-th column and the y2-th row are denoted by D(x1, y2), the correction coefficient calculation unit calculates a first correction coefficient α(x, y) and a second correction coefficient β(x, y) in pixels arranged in x columns and y rows on the basis of following expressions:

$$\alpha \approx \{D(x_1, y_1) - D(x_1, y_2)\} / \ln \frac{t_e(y_1) * t_s(y_2)}{t_s(y_1) * t_e(y_2)}$$

$$\beta(x, y) \approx D(x, y) - \alpha \ln \frac{t_e(y)}{t_s(y)}.$$

6. The image pickup apparatus according to claim 5, wherein, when the third time in the pixels arranged in the x columns and the y rows is denoted by ts'(y) and the fourth time in the pixels arranged in the x columns and y rows is denoted by te'(y), the arithmetic unit predicts the amount of offset Dpre in the pixels arranged in the x columns and the y rows on the basis of a following expression:

$$D_{pre}(x, y) \approx \alpha \ln \frac{t'_e(y)}{t'_s(y)} + \beta(x, y).$$

7. The image pickup apparatus according to claim 1, wherein the first inter-image pickup operation is one of following operations: an operation for applying a second voltage, which is different from a first voltage applied to the conversion elements in the first image pickup operation and the second image pickup operation; and an operation for radiating light onto the conversion elements separately from the radiation.

8. The image pickup apparatus according to claim 1, wherein the conversion elements each include a photoelectric conversion element and a wavelength conversion member that converts the radiation into light in a wavelength band detectable by the photoelectric conversion element.

9. An image pickup system comprising:
the image pickup apparatus according to claim 1; and
a radiation generation apparatus that generates the radiation.

10. A method for controlling an image pickup apparatus, the method comprising:
executing, using a detector that includes a plurality of conversion elements which convert radiation into charge and that executes an image pickup operation in which electrical signals based on the charge are output, in a period between a first image pickup operation and a second image pickup operation, which is executed after the first image pickup operation, among the image pickup operations that are performed a plurality of times, inter-image pickup operations including a first inter-image pickup operation for suppressing a lag generated by the first image pickup operation and a second inter-image pickup operation for obtaining, from the detector, dark signals based on charges included in the conversion elements that are in a state in which the radiation is not radiated after the first inter-image pickup operation;
calculating, using a signal processing unit that executes arithmetic processing on the electrical signals output from the detector, a correction coefficient using a first time until the conversion elements begin to accumulate charges for the second inter-image pickup operation after the first inter-image pickup operation is completed, a second time until the second inter-image pickup operation begins after the first inter-image pickup operation is completed, and the dark signals;
predicting, using the signal processing unit, an amount of offset to be included in electrical signals output from the detector in the second image pickup operation using a third time until the conversion elements begin to accumulate charges for the second image pickup operation after the first inter-image pickup operation is completed, a fourth time until an operation for outputting the electrical signals begins in the second image pickup operation after the first inter-image pickup operation is completed, and the correction coefficient; and
executing, using the signal processing unit, calculation using the electrical signals and the amount of offset output from the detector in the second image pickup operation.

11. An image pickup apparatus comprising:
a detector that includes a plurality of conversion elements which convert radiation into charge and that executes image pickup operations in which electrical signals based on the charge are output;
a control unit that controls the detector such that the detector executes, in a period between a first image pickup operation and a second image pickup operation, which is executed after the first image pickup operation, among the image pickup operations that are performed a plurality of times, inter-image pickup operations including a first inter-image pickup operation for suppressing a lag generated by the first image pickup operation and a second inter-image pickup operation for obtaining, from the detector, dark signals based on charges included in the conversion elements that are in a state in which the radiation is not radiated after the first inter-image pickup operation; and a signal processing unit that executes arithmetic processing on the electrical signals output from the detector, wherein the signal processing unit is configured to execute, based on a correction coefficient calculated using a time according to a time elapsed after the first inter-image pickup operation is completed and the dark signals, arithmetic processing for correcting offset of the electrical signals output from the detector in the second image pickup operation.

12. The image pickup apparatus according to claim 11, wherein the signal processing unit includes a period calculation unit that calculates the times on the basis of control signals output from the control unit to the detector, a correction coefficient calculation unit that calculates the correction coefficient using a first time until the conversion elements begin to accumulate charges for the second inter-image pickup operation after the first inter-image pickup operation is completed, a second time until the second inter-image pickup operation begins after the first inter-image pickup operation is completed, and the dark signals, a prediction unit that predicts the amount of offset using a third time until the conversion elements begin to accumulate charges for the second image pickup operation after the first inter-image pickup operation is completed, a fourth time until an operation for outputting the electrical signals begins in the second image pickup operation after the first inter-image pickup operation is completed, and the correction coefficient, and an arithmetic unit that subtracts the amount of offset from the electrical signals output from the detector in the second image pickup operation.

13. The image pickup apparatus according to claim 12, wherein the correction coefficient includes a first correction coefficient and a second correction coefficient, and wherein, when the dark signals are denoted by D, the first time is denoted by ts, the second time is denoted by te, time elapsed since the first inter-image pickup operation was completed is denoted by t, the first correction coefficient is denoted by $\alpha$, and the second correction coefficient is denoted by $\beta$, the correction coefficient calculation unit calculates the first correction coefficient and the second correction coefficient on the basis of a following expression:

$$D \approx \alpha \int_{ts}^{te} t^{-1} dt + \beta = \alpha \ln \frac{t_e}{t_s} + \beta.$$

14. The image pickup apparatus according to claim 13, wherein the detector includes a detection unit in which a plurality of pixels including the conversion elements and switching elements connected to the first electrodes are arranged in a matrix and a drive circuit that closes the switching elements in order to output the electrical signals from the detection unit row by row, wherein the control unit outputs a control signal to the drive circuit, and wherein the period calculation unit calculates the first time on the basis of the control signal output from the control unit to the drive circuit.

15. The image pickup apparatus according to claim 14, wherein, when the first time in pixels in an xl-th column and a yl-th row is denoted by ts(yl), the first time in pixels in the xl-th column and a y2-th row is denoted by ts(y2), the second time in the pixels in the xl-th column and the yl-th row is denoted by te(yl), the second time in the pixels in the xl-th column and the y2-th row is denoted by te(y2), the dark signals in the xl-th column and the yl-th row are denoted by D(xl, yl), and the dark signals in the pixels in the xl-th column and the y2-th row are denoted by D(xl, y2), the correction coefficient calculation unit calculates a first correction coefficient $\alpha(x, y)$ and a second correction coefficient $\beta(x, y)$ in pixels arranged in x columns and y rows on the basis of following expressions:

$$\alpha \approx \{D(x_1, y_1) - D(x_1, y_2)\} / \ln \frac{t_e(y_1) * t_s(y_2)}{t_s(y_1) * t_e(y_2)}$$

$$\beta(x, y) \approx D(x, y) - \alpha \ln \frac{t_e(y)}{t_s(y)}.$$

16. The image pickup apparatus according to claim 15, wherein, when the third time in the pixels arranged in the x columns and the y rows is denoted by ts'(y) and the fourth time in the pixels arranged in the x columns and y rows is denoted by te'(y), the arithmetic unit predicts the amount of offset Dpre in the pixels arranged in the x columns and the y rows on the basis of a following expression:

$$D_{pre}(x, y) \approx \alpha \ln \frac{t'_e(y)}{t'_s(y)} + \beta(x, y).$$

17. The image pickup apparatus according to claim 11, wherein the first inter-image pickup operation is one of following operations: an operation for applying a second voltage, which is different from a first voltage applied to the conversion elements in the first image pickup operation and the second image pickup operation; and an operation for radiating light onto the conversion elements separately from the radiation.

18. The image pickup apparatus according to claim 11, wherein the conversion elements each include a photoelectric conversion element and a wavelength conversion member that converts the radiation into light in a wavelength band detectable by the photoelectric conversion element.

19. An image pickup system comprising:
an image pickup apparatus; and
a radiation generation apparatus that generates the radiation,
wherein the image pickup apparatus includes:
a detector that includes a plurality of conversion elements which convert radiation into charge and that executes image pickup operations in which electrical signals based on the charge are output;
a control unit that controls the detector such that the detector executes, in a period between a first image pickup operation and a second image pickup operation, which is executed after the first image pickup operation, among the image pickup operations that are performed a plurality of times, inter-image pickup operations including a first inter-image pickup operation for suppressing a lag generated by the first image pickup operation and a second inter-image pickup operation for obtaining, from the detector, dark signals based on charges included in the conversion elements that are in a state in which the radiation is not radiated after the first inter-image pickup operation; and a signal processing unit that executes arithmetic processing on the electrical signals output from the detector, and wherein the signal processing unit is configured to execute arithmetic processing on the electrical signals output from the detector in the second image pickup operation, using an amount of offset to be included in the electrical signals output from the detector in the second image pickup operation, the amount of offset being predicted using a correction coefficient calculated using a time after the first inter-image pickup for an operation to accumulate charges of the conversion elements in the second inter-image pickup operation is completed and the dark signals, and a time after the first inter-image pickup operation for the operation to accumulate charges of the conversion elements in the second inter-image pickup operation is completed after the first inter-image pickup operation is completed.

20. A method for controlling an image pickup apparatus, the method comprising:

executing, using a detector that includes a plurality of conversion elements which convert radiation into charge and that executes an image pickup operation in which electrical signals based on the charge are output, in a period between a first image pickup operation and a second image pickup operation, which is executed after the first image pickup operation, among the image pickup operations that are performed a plurality of times, inter-image pickup operations including a first inter-image pickup operation for suppressing a lag generated by the first image pickup operation and a second inter-image pickup operation for obtaining, from the detector, dark signals based on charges included in the conversion elements that are in a state in which the radiation is not radiated after the first inter-image pickup operation;

calculating, using a signal processing unit that executes arithmetic processing on the electrical signals output from the detector, a correction coefficient using a time according to a time elapsed after the first inter-image pickup operation is completed and the dark signals; and executing, using the signal processing unit, based on the correction coefficient, arithmetic processing for correcting offset of the electrical signals output from the detector in the second image pickup operation.

* * * * *